(12) United States Patent
Hueber et al.

(10) Patent No.: US 7,535,179 B2
(45) Date of Patent: May 19, 2009

(54) LAMP BULBS FOR DISCHARGE LAMPS MADE FROM ALUMINOSILICATE GLASS, DISCHARGE LAMPS MADE WITH SAME AND METHOD OF MAKING SAME

(75) Inventors: Brigitte Hueber, Weiden (DE); Juergen Achatz, Weidenberg (DE); Franz Ott, Mitterteich (DE); Joerg Fechner, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/392,563

(22) Filed: Mar. 20, 2003

(65) Prior Publication Data
US 2003/0184211 A1 Oct. 2, 2003

(30) Foreign Application Priority Data
Mar. 26, 2002 (DE) ................. 102 13 741

(51) Int. Cl.
*H01J 5/04* (2006.01)
*C03C 3/091* (2006.01)
*C03C 3/095* (2006.01)

(52) U.S. Cl. .................. 313/636; 313/493; 501/55; 501/64; 501/68; 501/69; 501/70

(58) Field of Classification Search ............. 313/493, 313/636; 501/6, 10, 64–65, 66–70, 94, 55
See application file for complete search history.

(56) References Cited

U.S. PATENT DOCUMENTS

| | | | | |
|---|---|---|---|---|
| 3,581,137 A | * | 5/1971 | Arnott et al. ............. | 313/486 |
| 4,047,067 A | | 9/1977 | Clausen | |
| 4,459,510 A | | 7/1984 | Joorman | |
| 4,751,148 A | | 6/1988 | Popma et al. | |
| 5,028,567 A | * | 7/1991 | Gotoh et al. ............. | 501/10 |
| 5,619,096 A | * | 4/1997 | Kaliszewski et al. ..... | 313/489 |
| 5,666,031 A | * | 9/1997 | Jennato et al. ........... | 315/246 |
| 5,883,030 A | * | 3/1999 | Bako et al. .............. | 501/66 |
| 5,990,627 A | * | 11/1999 | Chen et al. ............. | 315/117 |
| 6,069,100 A | * | 5/2000 | Naumann et al. ........ | 501/67 |
| 6,074,969 A | * | 6/2000 | Naumann et al. ........ | 501/64 |
| 6,087,284 A | * | 7/2000 | Brix et al. .............. | 501/69 |
| 6,303,528 B1 | * | 10/2001 | Speit et al. ............. | 501/69 |
| 6,680,266 B1 | * | 1/2004 | Peuchert et al. ......... | 501/66 |

(Continued)

FOREIGN PATENT DOCUMENTS

DE  197 47 354  12/1998

(Continued)

*Primary Examiner*—Karabi Guharay
(74) *Attorney, Agent, or Firm*—Michael J. Striker

(57) ABSTRACT

The lamp bulb for discharge lamps is made from an aluminosilicate glass with a transformation temperature Tg>600° C. The aluminosilicate glass has a composition (in % by weight, based on oxide content) of $SiO_2$>55-64; $Al_2O_3$, 13-18; $B_2O_3$, 0-5.5; MgO, 0-7; CaO, 5-14; SrO, 0-8; BaO, 6-17; $ZrO_2$, 0-2; $TiO_2$, 0-5, but may contain small amounts of $CeO_2$ and/or $Fe_2O_3$, for anti-solarization and fining agents, such as $SnO_2$, $Sb_2O_3$ and/or $As_2O_3$. The lamp bulbs for the discharge lamps of the invention may include a melted-in molybdenum electrode and/or an electrode feed or they may be free of any internal electrodes. A method for making the lamp bulbs is also described.

18 Claims, 1 Drawing Sheet

U.S. PATENT DOCUMENTS

2003/0181309 A1* 9/2003 Kunert et al. ................. 501/71
2004/0070327 A1 4/2004 Bergmann et al.

FOREIGN PATENT DOCUMENTS

| DE | 197 47 355 | 6/1999 |
| DE | 197 58 481 | 6/1999 |
| JP | 11-217235 | 8/1999 |
| KR | 1020000037279 | 7/2000 |

* cited by examiner

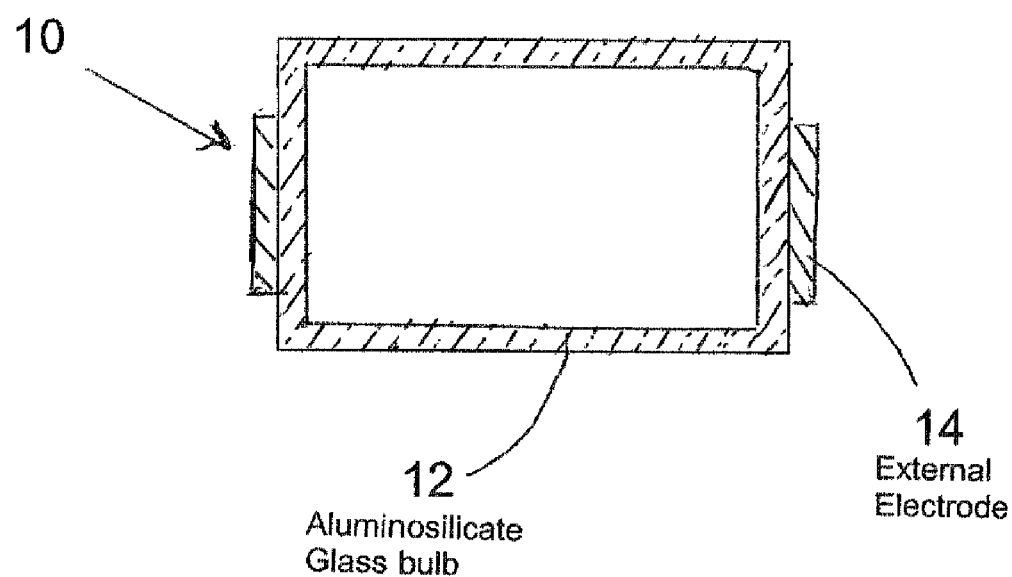

LAMP BULBS FOR DISCHARGE LAMPS MADE FROM ALUMINOSILICATE GLASS, DISCHARGE LAMPS MADE WITH SAME AND METHOD OF MAKING SAME

BACKGROUND OF THE INVENTION

1. Field of the Invention

The present invention relates to methods of making lamp bulbs of discharge lamps. The invention also relates to the lamp bulbs made by the methods. The invention in addition relates to the discharge lamps, in particular the miniaturized discharge lamps, made from the lamp bulbs.

2. Description of the Related Art

A lamp bulb is to be understood as meaning the discharge vessel in which the light is generated.

Miniaturized discharge lamps, which are known as backlights, are used for background illumination of, for example, displays, such as displays of personal computers, laptops, pocket calculators, vehicle navigation systems, flat screens and mobile telephones. Typical external diameters for miniaturized discharge lamps of this type are between 2 and 5 mm. Typical internal diameters are between 1 and 4.8 mm.

Because of the structure of standard discharge lamps, it must generally be possible for the glasses used to be fused to a metal or metal alloy which is suitable as an electrode and/or electrode feed. For this purpose, the glasses should have thermal expansion characteristics, which are matched to the thermal expansion characteristics of the metal or metal alloy and a transformation temperature, which is matched to the fusing temperature.

The glasses which are customarily used for discharge lamps, including in particular for backlights, therefore, have transformation temperatures Tg which are matched to a fused seal with alloys, such as KOVAR®, i.e. relatively low transformation temperatures of Tg<550° C.

In a special type of discharge lamp, known as the EEFL, which stands for external electrode fluorescent lamp, i.e. a discharge lamp without an internal electrode, which is also available in miniaturized form, the requirements which have been described with regard to thermal expansion and transformation temperature are not the primary considerations.

A significant property for glasses for discharge lamps of any type is the transmission curve of the glasses. In the visible region (VIS), a high light transmission is required in order to obtain high illumination efficiency from the discharge lamps. In the UV region, no transmission or a low transmission is desirable, in order to pass only the minimum possible amount of harmful UV radiation. Especially for backlights, a high UV blocking at $\leq 260$ nm is desirable, so that irradiated plastic parts, for example in laptops, do not become yellow and brittle.

The requirement for transmission in the visible wavelength region between 400 nm and 800 nm is a transmission $\tau > 90\%$ with a specimen thickness of 0.2 mm. The requirement for transmission in the UV region <260 nm is $\tau < 1\%$ with a specimen thickness of 0.2 mm.

Resistance to solarization is a further important property for backlights. This is required so that the service life of the lamps is long, i.e. a light efficiency which remains as constant as possible.

The term "solarization-resistant" is to be understood as meaning in this context glasses whose transmission at $\lambda = 300$ nm (specimen thickness 0.2 mm) drops by at most 10% after 15 hours of HOK-4 irradiation, i.e. irradiation with a high-pressure mercury lamp with a main emission at 365 nm and an irradiation strength of 850 $\mu W/cm^2$ at 200 to 280 nm at a distance of 1 m.

The desired properties of transmission or blocking and solarization resistance can be achieved with the aid of dopants, for example by adding $TiO_2$, $Fe_2O_3$ and/or $CeO_2$.

U.S. Pat No. 4,047,067 discloses discharge lamps in which the lamp bulb consists of silica glass, which is coated with a layer of aluminosilicate glass. The coating of aluminosilicate glass is made by fusing aluminum oxide to the silica glass surface at high temperatures.

U.S. Pat. No. 4,751,148 discloses luminescent aluminoborate and/or aluminosilicate glasses, which are activated with rare earths. These glasses are used as luminescent layers on luminescent screens, for example for cathode ray tubes.

It is known to use borosilicate glasses for lamp bulbs for discharge lamps.

A drawback of the known borosilicate glasses used for discharge lamps is their relatively low thermal stability. This drawback restricts, for example, the upper limit for the firing temperature for the phosphor. The phosphors required, generally inorganic crystals such as silicates, tungstates, phosphates and aluminates of the rare earths, are applied to the glass as a suspension in high-molecular-weight organic binders, for example binders based on butyl rubber with collodion wool, in which case the organic binder would have to be completely evaporated out before the lamp is used in order for it not to have any adverse effect on the gas discharge. With conventional discharge lamp glasses, this is only achieved incompletely or is only achieved after a very long time and with yield losses on account of deformation of the glass.

SUMMARY OF THE INVENTION

Therefore, it is an object of the invention to provide a glass, which has high thermal stability and satisfies the other abovementioned requirements imposed on glasses used for making lamp bulbs of discharge lamps.

It is another object of the invention to provide a lamp bulb for a discharge lamp, which has a high thermal stability, and hence a discharge lamp, in particular a miniaturized discharge lamp, which has a high thermal stability.

It is an additional object of the invention to provide a method of making lamp bulbs with and without internal electrodes from an aluminosilicate glass, so that the lamp bulbs have high thermal stability.

These objects of the invention are attained by a lamp bulb made from an aluminosilicate glass having a transformation temperature Tg>600° C., preferably $\geq 700$° C. These glasses have a very high thermal stability. A method according to the invention for making the lamp bulb is described hereinbelow.

The objects of the invention are also attained by a discharge lamp including a lamp bulb according to the invention.

The glasses which are used according to the invention are preferably alkaline-earth aluminosilicate glasses.

The preferred aluminosilcate glasses, which are used for the lamp bulbs according to the invention, have a composition (in % by weight, based on oxide content) comprising: $SiO_2$ >55-64; $Al_2O_3$, 13-18; $B_2O_3$, 0-5.5; MgO, 0-7; CaO, 5-14; BaO, 6-17; $ZrO_2$, 0-2; $TiO_2$, 0-5.

It is particularly preferable to use aluminosilicate glasses with a composition from the range (in % by weight, based on oxide): $SiO_2$, 59-62; $Al_2O_3$, 13.5-15.5; $B_2O_3$, 3-5.5; MgO, 2.3-5; CaO, 8.2-10.5; BaO, 8.5-9.5; $ZrO_2$, 0-1.5; $TiO_2$, 0-3 and with a composition from the range (in % by weight, based on oxide): $SiO_2$, >58-62; $Al_2O_3$, 14-17.5, preferably 15-17.5; $B_2O_3$, 0-1, preferably 0.2-0.7; MgO, 0-7, preferably 0-3, particularly preferably 0-<1; CaO, 5.5-14; BaO, 6-17, preferably 6-10; SrO, 0-8; $ZrO_2$, 0-1.5, preferably 0.05-1; and $TiO_2$, 0-3.

Glasses of this type are already known from DE 197 47 355 C1, DE 197 47 354 C1 and DE 197 58 481 C1.

The aluminosilicate glasses having the above-described compositions have a transformation temperature $Tg \geq 700°$ C. and a coefficient of thermal expansion $\alpha_{20/300}$ of between $4.3 \times 10^{-6}$/K and $4.95 \times 10^{-6}$/K.

Therefore, the glasses have a particularly high thermal stability. Although their thermal expansion makes them unsuitable for fusing to KOVAR®, an Fe—Co—Ni alloy, they are very suitable indeed for fusing to other metals, for example to molybdenum. Therefore, the glasses are particularly suitable as bulb material for discharge lamps with fused-in molybdenum electrodes and/or molybdenum electrode feeds.

The glasses with a composition from the range mentioned are also eminently suitable for the production of discharge lamps without an internal electrode. Instead of the internal electrode fused to the glass bulb (lamp bulb), these lamps have a very thin metal strip, which is clamped or adhesively bonded in place and allows the discharge to take place in the lamp, at both ends of the lamp bulb. In this case, therefore, there is no need for any glass-metal fusion to take place.

This type of lamp is preferably a miniaturized discharge lamp.

The aluminosilicate glasses mentioned have a high transmission in the visible region and a low transmission in the UV region. The glasses have a sufficient resistance to solarization.

To increase the resistance to solarization and for targeted setting of the UV edge in terms of position and steepness, the glasses may, in addition to the above-mentioned $TiO_2$ (0-5% by weight, preferably at least 0.2% by weight), also contain one or more further standard dopants. These are in particular $CeO_2$ and $Fe_2O_3$. However, the sum of $CeO_2$ and $Fe_2O_3$ should not exceed 5% by weight, preferably 1% by weight (preferably with 0-0.5% $Fe_2O_3$ and 0-0.5% $CeO_2$). The $CeO_2$ content is preferably 0-0.1% by weight. The sum of $TiO_2$, $CeO_2$ and $Fe_2O_3$ is preferably at least 0.01% by weight, preferably at least 0.1% by weight, particularly preferably at least 0.2% by weight.

The glasses may contain standard fining agents in standard quantities, for example evaporation fining agents, such as $Cl^-$, but also redox fining agents, which are effective on account of their polyvalent cations, e.g. $SnO_2$ (preferably 0-0.5% by weight); $Sb_2O_3$ (preferably 0-0.5% by weight) and $As_2O_3$ (preferably 0-0.5% by weight), in which case the sum of $SnO_2$, $Sb_2O_3$ and $As_2O_3$ should not exceed 1% by weight.

The invention and its advantages are to be explained in more detail with reference to the following exemplary embodiments.

EXEMPLARY EMBODIMENTS

A glass having the following composition (in % by weight, based on oxide content): $SiO_2$, 60.75; $Al_2O_3$, 16.5; CaO, 13.5; $B_2O_3$, 0.3; $ZrO_2$, 1.0; BaO, 7.85; $TiO_2$, 0.011, $CeO_2$, 0.002; $Fe_2O_3$, 0.003 was melted from standard raw materials at 1640° C., fined and agitated. Finally, tubes were drawn using the down-drawing process. Discharge lamps were produced from these small glass tubes in the usual way.

The heat-up temperature at which the binder of the phosphor was evaporated out was 620° C.

In the same way, a glass of the same basic glass composition and containing 0.005% by weight of $TiO_2$, 0.0025% by weight of $CeO_2$ and 0.0025% by weight of $Fe_2O_3$ was produced and processed to form a discharge lamp having a lamp bulb made from this glass.

The glasses have a Tg of 790° C., a coefficient of thermal expansion of $\alpha_{20/300} = 4.7 \times 10^{-6}$/K, a $\tau$ (400-800 nm)>90% (specimen thickness 0.2 mm); a $\tau$ (<260 nm)<1% (specimen thickness 0.2 mm); a solarization resistance, given as the difference in the transmission at $\lambda = 300$ nm between a specimen which has not been irradiated and a specimen which has been irradiated for 15 hours using an HOK-4 lamp, i.e. as $\Delta_{15}$, $\tau$ (300 nm), of <10% (specimen thickness 0.2 mm).

These results document the excellent suitability of the glasses as lamp bulb material for discharge lamps, i.e. their suitability for use for the production of discharge lamps.

On account of their high transformation temperature Tg>600° C., during production the organic binder of the phosphor which has been applied can be evaporated out completely and quickly. Therefore, the gas discharge is not disrupted when the lamp is operating.

Because of the high firing temperatures which are possible because of the high thermal stability of the glasses, advantageously
    the production times, especially the throughput times in the tempering furnace, are shortened,
    the yields are increased, since the tubes are not plastically deformed even at high temperatures,
    the service life of the lights is increased, since the binder is completely removed and does not escape only during use.

With their transmission curve, documented by $\tau$ (400-800 nm) and $\tau$ (<260 nm)<1%, and their solarization resistance $\Delta_{15}$, $\tau$ (300 nm)$\leq$10% (specimen thickness in each case 0.2 mm), the glasses are eminently suitable for use as discharge lamp glasses, especially for use as backlights.

With expansion coefficients $\alpha_{20/300}$ of between $4.3 \times 10^{-6}$/K and $4.95 \times 10^{-6}$/K the glasses can be fused to selected metals and metal alloys, in particular to Mo. Therefore, they are suitable for the production of discharge lamps with lamp bulbs made from these glasses and especially of miniaturized discharge lamps, what are known as backlights.

The aluminosilicate glasses of the present invention are particularly suitable for the production of internal electrode-free discharge lamps, which are known as EEFLs, since in this type of lamp, on account of the absence of internal electrodes, there are no restrictions with regard to the external electrodes and leads.

The glasses can be processed in the usual way to form discharge lamps, especially to form miniaturized discharge lamps, and in particular to form discharge lamps without an internal electrode.

BRIEF DESCRIPTION OF THE DRAWING

The objects, features and advantages of the invention will now be illustrated in more detail with the aid of the following description of the following example, with reference to the accompanying sole FIGURE which is a sectional view through an internal electrode-free discharge lamp with external electrodes according to the present invention.

The sole FIGURE shows an internal electrode-free discharge lamp 10 comprising an aluminosilicate glass bulb 12 of the present invention and metal strips 14 acting as external electrodes affixed to opposite ends of the glass bulb.

The disclosure in German Patent Application 102 13 741.2-45 of Mar. 26, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for making lamp bulbs for discharge lamps from aluminosilicate glass, and lamp bulbs and discharge lamps made thereby, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An electrode-free discharge-lamp bulb without any internal electrode, said discharge-lamp bulb comprising an aluminosilicate glass, wherein said aluminosilicate glass has a transformation temperature Tg >600° C. and a composition, in % by weight, based on oxide content, comprising:

| | |
|---|---|
| $SiO_2$ | >55-64; |
| $Al_2O_3$ | 13-18; |
| $B_2O_3$ | 3-5.5; |
| MgO | 0-7; |
| CaO | 5-14; |
| SrO | 0-8; |
| BaO | 6-17; |
| $ZrO_2$ | 0-2; |
| $TiO_2$ | 0.2-5. |

2. The discharge-lamp bulb as defined in claim 1, wherein said aluminosilicate glass has a composition, in % by weight, based on oxide content, comprising:

| | |
|---|---|
| $SiO_2$ | 59-62; |
| $Al_2O_3$ | 13.5-15.5; |
| $B_2O_3$ | 3-5.5; |
| MgO | 2.3-5; |
| CaO | 8.2-10.5; |
| SrO | 0-8; |
| BaO | 8.5-9.5; |
| $ZrO_2$ | 0-1.5; |
| $TiO_2$ | 0.2-3. |

3. The discharge-lamp bulb as defined in claim 1, wherein said aluminosilicate glass includes at least one fining agent selected from the group consisting of $SnO_2$, $Sb_2O_3$ and $As_2O_3$ and at least one dopant selected from the group consisting of $CeO_2$ and $Fe_2O_3$ and wherein said at least one fining agent is present in said aluminosilicate glass in an amount of from 0 to 1% by weight, based on oxide content, and said at least one dopant is present in said aluminosilicate glass in an amount of from 0 to 5% by weight, based on oxide content.

4. The discharge-lamp bulb as defined in claim 3, wherein said amount of said at least one dopant is from 0 to 1% by weight, based on oxide content.

5. The discharge-lamp bulb as defined in claim 1, wherein said aluminosilicate glass includes at least one dopant selected from the group consisting of $CeO_2$ and $Fe_2O_3$ and wherein said at least one dopant is present in said aluminosilicate glass in an amount greater than or equal to 0.01% by weight, based on oxide content.

6. The discharge-lamp bulb as defined in claim 5, wherein said amount of said at least one dopant is greater than or equal to 0.1% by weight, based on oxide content.

7. The discharge-lamp bulb as defined in claim 5, wherein said amount of said at least one dopant is greater than or equal to 0.2% by weight, based on oxide content.

8. The discharge-lamp bulb as defined in claim 1, wherein said transformation temperature of said aluminosilicate glass $\geq 700°$ C. and said aluminosilicate glass has a coefficient of thermal expansion, $\alpha_{20/300}$, of from $4.3 \times 10^{-6}$/K to $4.95 \times 10^{-6}$/K.

9. A discharge lamp comprising a discharge-lamp bulb without any internal electrode, said discharge-lamp bulb comprising an aluminosilicate glass, wherein said aluminosilicate glass has a transformation temperature Tg >600° C. and a composition, in % by weight, based on oxide content, comprising:

| | |
|---|---|
| $SiO_2$ | >55-64; |
| $Al_2O_3$ | 13-18; |
| $B_2O_3$ | 3-5.5; |
| MgO | 0-7; |
| CaO | 5-14; |
| SrO | 0-8; |
| BaO | 6-17; |
| $ZrO_2$ | 0-2; |
| $TiO_2$ | 0.2-5; and |
| $CeO_2 + Fe_2O_3$ | 0-1. |

10. The discharge lamp as defined in claim 9, wherein said aluminosilicate glass comprises at least one fining agent selected from the group consisting of $SnO_2$, $Sb_2O_3$ and $As_2O_3$ and wherein said at least one fining agent is present in said aluminosilicate glass in an amount of from 0 to 1% by weight, based on oxide content.

11. The discharge lamp as defined in claim 9, consisting of a miniaturized discharge lamp for background illumination of a display.

12. The discharge lamp as defined in claim 9, further comprising respective metal strips acting as external electrodes, which are bonded to opposite ends of the discharge-lamp bulb.

13. A discharge-lamp bulb comprising an aluminosilicate glass, said aluminosilicate glass having a transformation temperature Tg >600° C. and comprising from 0.2 to 5% by weight of $TiO_2$, from 0.2 to 5.5 percent by weight $B_2O_3$, from 0.0025 to 0.5 percent by weight of $Fe_2O_3$, from 0.002 to 0.5 percent by weight of $CeO_2$, and from 0 to 8 percent by weight SrO;

wherein the aluminosilicate glass has a solarization resistance, given as a difference in respective transmissions ($\tau$) at $\lambda = 300$ nm between a sample that has not been irradiated and a specimen that has been irradiated for 15 hours with a high-pressure mercury discharge lamp with a main emission at 365 nm and an irradiation strength of 850 μW/cm$^2$ at wavelengths between 200 to 280 nm at a distance of 1 m, as $\Delta_{15}, \tau(300\,nm)$, of >10% for a sample of thickness 0.2 mm.

14. The discharge-lamp bulb as defined in claim 13, wherein said transformation temperature is greater than or equal to 700° C., and said aluminosilicate glass has a coefficient of thermal expansion of $\alpha_{20/300} = 4.3$ to $4.95 \times 10^{-6}$/K.

15. A discharge lamp comprising a discharge-lamp bulb, said discharge-lamp bulb consisting of an aluminosilicate glass, said aluminosilicate glass having a transformation temperature Tg >600° C. and comprising from 0.2 to 5% by weight of $TiO_2$, from 0.2 to 5.5 percent by weight $B_2O_3$, from 0.0025 - 0.5 percent by weight of $Fe_2O_3$, from 0.002 to 0.5 percent by weight of $CeO_2$, and from 0 to 8 percent by weight SrO;

wherein the aluminosilicate glass has a solarization resistance, given as a difference in respective transmissions ($\tau$) at $\lambda$=300 nm between a sample that has not been irradiated and a specimen that has been irradiated for 15 hours with a high-pressure mercury discharge lamp with a main emission at 365 nm and an irradiation strength of 850 µW/cm² at wavelengths between 200 to 280 nm at a distance of 1 m, as $\Delta_{15}, \tau$ (300 nm), of <10% for a sample of thickness 0.2 mm.

16. The discharge lamp as defined in claim 15, wherein said transformation temperature is greater than or equal to 700° C., and said aluminosilicate glass has a coefficient of thermal expansion of $\alpha_{20/300}$=4.3 to 4.95 ×10⁻/K.

17. A discharge-lamp bulb comprising an aluminosilicate glass having a transformation temperature Tg >600° C., an internal diameter of from 1 to 4.8 mm, and an external diameter of from 2 to 5 mm;

wherein said aluminosilicate glass has a composition, in % by weight, based on oxide content, comprising:

| | |
|---|---|
| $SiO_2$ | >55-64; |
| $Al_2O_3$ | 13-18; |
| $B_2O_3$ | 3-5.5; |
| MgO | 0-7; |
| CaO | 5-14; |

-continued

| | |
|---|---|
| SrO | 0-8; |
| BaO | 6-17; |
| $ZrO_2$ | 0-2; and |
| $TiO_2$ | 0.2-5. |

18. A discharge lamp comprising a discharge-lamp bulb with an internal diameter of from 1 to 4.8 mm and with an external diameter of from 2 to 5 mm and a phosphor applied to said discharge-lamp bulb;

wherein said discharge-lamp bulb consists of an aluminosilicate glass having a transformation temperature Tg >600° C. and said aluminosilicate glass has a composition, in % by weight, based on oxide content, comprising:

| | |
|---|---|
| $SiO_2$ | >55-64; |
| $Al_2O_3$ | 13-18; |
| $B_2O_3$ | 0.2-5.5; |
| MgO | 0-7; |
| CaO | 5-14; |
| SrO | 0-8; |
| BaO | 6-17; |
| $ZrO_2$ | 0-2; |
| $TiO_2$ | 0.2-5; |
| $Fe_2O_3$ | 0.0025-0.5; |
| $CeO_2$ | 0.002-0.5. |

* * * * *